(12) United States Patent  
Castellani et al.

(10) Patent No.: US 9,113,749 B2  
(45) Date of Patent: Aug. 25, 2015

(54) MACHINE FOR DISPENSING BEVERAGES

(75) Inventors: Andrea Castellani, Milan (IT); Ciro Adelmo Pilone, Calderara di Reno Bologna (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 354 days.

(21) Appl. No.: 13/054,953

(22) PCT Filed: Jul. 7, 2009

(86) PCT No.: PCT/IT2009/000297  
§ 371 (c)(1), (2), (4) Date: Jan. 20, 2011

(87) PCT Pub. No.: WO2010/010587  
PCT Pub. Date: Jan. 28, 2010

(65) Prior Publication Data  
US 2011/0120316 A1    May 26, 2011

(30) Foreign Application Priority Data  
Jul. 25, 2008  (IT) ................. FI2008A0141

(51) Int. Cl.  
*A47J 31/40* (2006.01)  
*A47J 31/52* (2006.01)  
*G06Q 20/32* (2012.01)  
*G06Q 20/40* (2012.01)  
*G07F 13/06* (2006.01)

(52) U.S. Cl.  
CPC ............... *A47J 31/52* (2013.01); *G06Q 20/327* (2013.01); *G06Q 20/40145* (2013.01); *G07F 13/065* (2013.01)

(58) Field of Classification Search  
CPC . A47J 31/52; G07F 13/065; G06Q 20/40145; G06Q 20/237  
USPC ...................... 99/280; 426/433, 594  
See application file for complete search history.

(56) References Cited

U.S. PATENT DOCUMENTS 7,455,867 B1 *  11/2008  Gutwein et al. ............ 426/594  
2004/0177004 A1 *  9/2004  Mueller et al. ................ 705/15

FOREIGN PATENT DOCUMENTS

| | | |
|---|---|---|
| CN | 1494854 A | 5/2004 |
| DE | 102006032707 A1 | 1/2008 |
| EP | 1477093 A1 | 11/2004 |
| EP | 1477094 A1 | 11/2004 |
| WO | 2005111955 A1 | 11/2005 |

OTHER PUBLICATIONS

DE 102006032707 machine translation.*

* cited by examiner

*Primary Examiner* — Jianying Atkisson

(57) ABSTRACT

The machine (1) comprises: at least one infusion unit (29) for preparing coffee, a user interface (9) and an electronic programmable control unit (15). The control unit is associated with a recognition system (11) for recognizing a user, and is programmed to actuate at least one function of the machine based upon the recognition of the user.

16 Claims, 5 Drawing Sheets

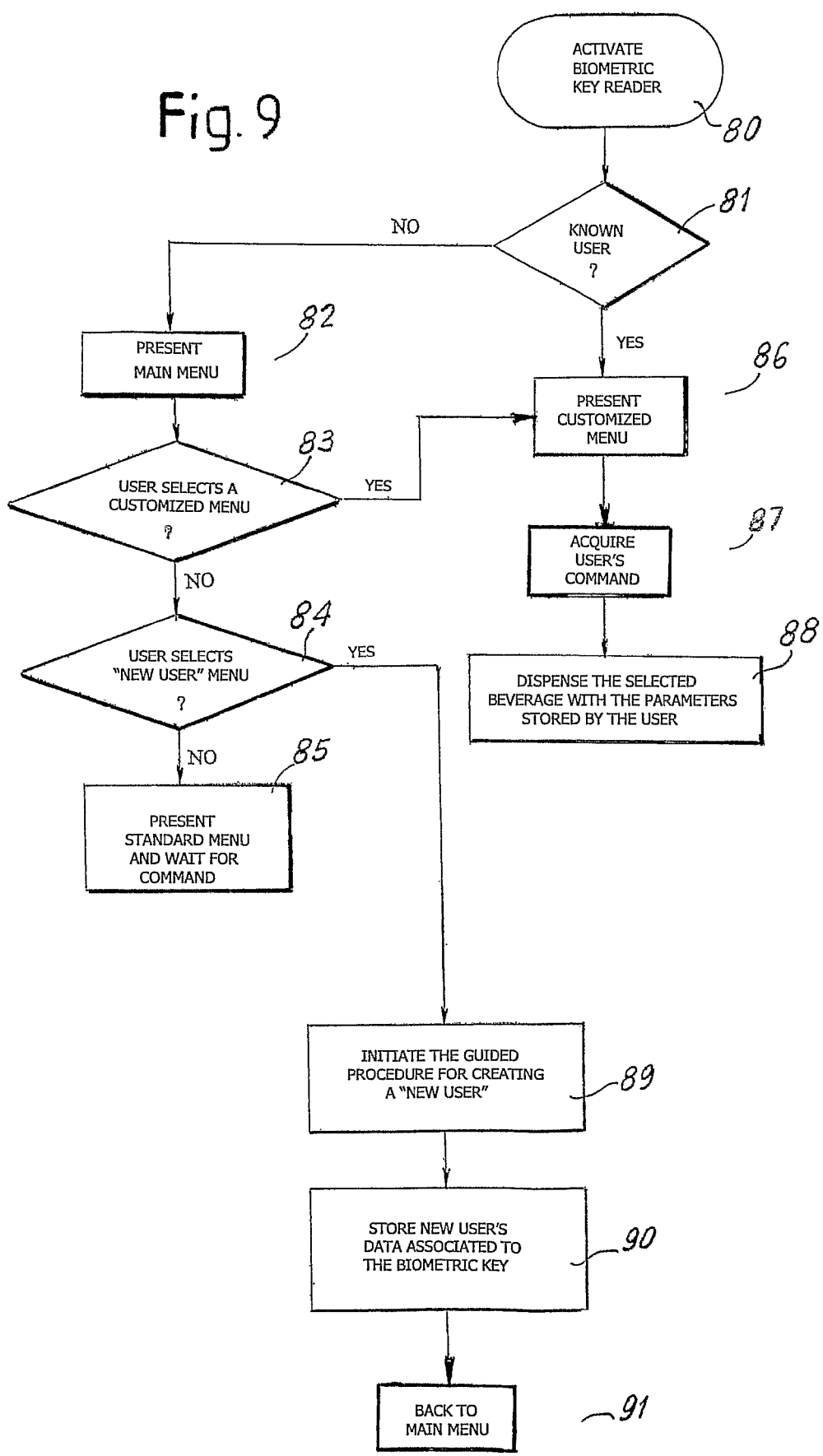

MACHINE FOR DISPENSING BEVERAGES

TECHNICAL FIELD

The present invention relates to improvements to machines for dispensing beverages, and in particular to coffee machines. In particular, although not exclusively, the invention relates to coffee machines of the automatic type for domestic use, to so called vending machines and the like. Therefore, in this description and in the attached claims "coffee machine" means any device for producing beverages, including coffee, but not limited to the production of this beverage, the machine being suitable, for example, to produce hot and cold beverages of different type. "Coffee machine" also means a so called vending machine.

STATE OF THE ART

Among the increasingly widely used domestic electrical appliances there are the automatic or semi-automatic machines for producing coffee. These machines can have a greater or lower degree of automation and a greater or lower number of functions which can be selected by the user. Some of these machines are designed so as to produce exclusively espresso coffee, whilst other machines are designed so as to produced espresso coffee and so-called filter coffee or American coffee. In some modern machines of this type, for example the model "Prima" produced by Saeco International Group S.p.A. (Italy) it is furthermore possible to produce cappuccino or "latte macchiato", thanks to the presence of adequate units also comprising a container for milk associated with the machine.

A similar variety of functions can be found in some vending machines, both for commercial retail use and for use in work environments, such as offices or the like. Also in this case it is possible to select different types of beverages, different functions, different qualities of a same beverage and so on.

In particular in the domestic field often the situation occurs, wherein the same domestic electrical appliance is used by a family with more members, each of them desiring a beverage prepared according to his/her own taste. The current machines allow adjustment of many parameters which influence the quality and the taste of the beverage produced. For example, in the case of espresso coffee, there are machines which allow to adjust the quantity of coffee powder for each supply, the size of the powder (granulometry) obtained through the milling of coffee beans, the quantity of water supplied for each supplying cycle and therefore for each cup. These adjustments may require interventions for programming the electronic control unit and/or actions on mechanical members.

Usually, the members of the same family, or in any case the users which use the same machine, can have also substantially different tastes; for this reason, the parameters set to satisfy the taste of one user can be inadequate to satisfy the taste of other users of the same machine. Although the modern machines have electronic interfaces which simplify the adjustment of given supply parameters, making it more intuitive, however setting these parameters requires not negligible times, and in any case times not compatible with the need for quickly supplying the required beverage. For this reason, the setting is usually performed on one occasion only, when the machine is purchased, or a limited number of times so as to obtain the better compromise between the needs of all the users.

SUMMARY OF THE INVENTION

According to one aspect, the object of the present invention is to completely or partially solve at least one of the problems indicated above. Within this general objective, the purpose of one embodiment of the present invention is to provide a machine for dispensing beverages, in particular coffee, which allows different users to obtain quickly and without the need for intervention for setting, beverages always corresponding to the need and the taste of each user.

Substantially, the invention is based on the idea of associating to the coffee machine a recognition system for recognizing a user, interfaced with an electronic programmable control unit for controlling the machine. In this way it is possible to program the machine so that it recognizes one or more regular users of the machine, so as to select the parameters for preparing the beverage which satisfy the specific user in an automatic manner, or in any case with simpler and more immediate operations than those generally provided for the setting of the machine.

In one possible preferred embodiment of the present invention this recognition system for recognizing the user is designed so as to recognize at least one biometric characteristic of the user. Biometric characteristic means generally a morphologic characteristic of a person, which allows to distinguish said person from the others. Typical biometric characteristics (also called biometric keys) are the following: the finger print, the surface characteristics of the palm of the hand, the face, the iris, the voice or the voice pattern, the DNA, the structure and distribution of the blood vessels in a particular portion of the body of the person, for example in the fingertip, in the retina or the like. Within the scope of the present invention and of the attached claims, "biometric characteristic or key" means any of the biometric characteristics or keys which can be detected by an automatic system for recognizing and distinguishing one person from another. The recognition system or system for detecting the biometric key can be of different types according to the characteristic or key used. For example, it is possible to use a CMOS camera for the recognition of somatic characteristic of the face of the user, or a finger print reader or other. It is also possible to combine different detecting systems for different biometric characteristics or keys, to be used in combination or alternatively.

A particularly advantageous embodiment of the present invention provides for the use of a biometric characteristic or key that can be detected on the user's finger. This characteristic is preferably represented by the finger print, although it is possible for example to detect the distribution of the blood vessels in the finger tip.

In this embodiment, the recognition of the user is particularly easy as the recognition system can be fitted with a sensor or other detection system incorporated in or associated with the button for activating the machine or in general to any component forming part of the user interface of the machine. In this way the user can be recognized by the machine without the need for performing operations additional to those usually performed for supplying the beverage. In other embodiments the machine can be fitted with a microphone and the control unit can be programmed so as to recognize the vocal pattern of a user, i.e. the individual characteristics of his/her voice.

Currently, the finger print recognition technique is highly developed, and recognition systems for recognizing the finger prints are available on the market, which are extremely sophisticated and characterized by a very high degree of reliability. These systems are generally used when the biometric recognition is essential to allow or deny the access to protected areas, to identify a criminal, to perform a transaction by means of telematic and electronic systems, or other needs that entails a high degree of certainty in recognition. This requires the use of particularly expensive technologies.

Vice versa, in the frame of the present invention, a recognition system for recognizing finger prints can be sufficient, which offers a lower degree of safety relative to that required in the above mentioned applications, and which is therefore of a much more limited cost.

According to a different, but less advantageous, embodiment of the present invention, the recognition system for recognizing the user can be based, instead of detecting a biometric key, upon detecting an identification element or code, i.e. a code for recognizing the user, associated for example with the cup or the glass used exclusively by a given user. In some embodiments it is possible to provide that a machine-readable code is associated with the cup or other container. This code can be represented by a bar code or more preferably by an electronic code stored in an electronic tag, in a transponder or a similar device, which can be advantageously incorporated inside the container so that no alterations, for example resulting from washing also in a dishwasher, affect it. In this case the machine can be fitted with a bar code reader, if the identification code is a bar code reproduced on the container, or an electronic tag reader, a transponder reader, or the like. This reader can be arranged on the machine in a suitable position, so that the user is recognized when he/she puts the container on the rest plane, with which the machine is fitted and on which the container must be arranged to collect the beverage supplied by the machine. Therefore, also in this case it is not necessary for the user to perform additional operations to be identified by the machine. However, it is necessary that the user always uses the same customized cup. In other embodiments the identification code can be contained in another type of support which can be read by the machine and which the user has. For example, the identification or recognition code of the user can be associated with a card or a badge for recognizing the user, containing a generic storage system, such as a magnetic tape or an electronic circuit, and a communication system through a transponder or other. In other embodiments the identification code can be contained in a generic electronic device containing a tag or other storage medium, for example a mobile phone which can communicate with the machine for supplying the beverage through a Bluetooth connection or the like, or in general a system for communicating with the machine supplying the beverages. Systems of this type can be particularly advantageous in the case of machines for supplying beverages in work places, more than in domestic environments.

The principle of using a system for recognizing the user can be usefully applied also to particularly simple machines, for example machines for producing only espresso coffee. It is known, in fact, that the automatic or semi-automatic machines for producing espresso coffee are provided with systems for setting different parameters among which: grinding fineness of the coffee beans, the quantity of ground coffee for each supply, the quantity of water supplied for each cup of coffee. A recognition system for recognizing a user, a biometric key detecting system, or a system for detecting an identification code associated for example to the cup or other container, can allow more users to obtain the preparation of a coffee always characterized by the set parameters and therefore with the taste preferred by the user, without the need for interventions on adjustment members.

However, the present invention allows to obtain the maximum advantage when used on more complex machines, for example and in particular on machines which allow to supply beverages of various type, such as for example espresso coffee, long coffee or filter coffee, cappuccino, "latte macchiato" and the like. In this case it is possible to provide for the electronic control unit of the machine to be programmed so as to present to each individual user a customized menu. This menu can present all the beverages that the machine can supply, or only some of them if the user has programmed the machine in this way. For example, if the user usually drinks exclusively espresso coffee or cappuccino, he/she can exclude from his/her customized menu other types of beverages that the machine can supply. For one or each of the beverages selected and inserted into his/her customized menu, the user can set one or more parameters for the supply, such as: the quantity of coffee, the granulometry of the coffee, the quantity of water, the quantity of milk, the quantity of creamy foam, the ration coffee/milk, the temperature of the milk or other.

In some embodiments of the present invention, the control unit is advantageously programmed so as to offer a generic or standard menu, when it is not able to recognize the user, or when the user expressly requires it. For example, if the machine is provided with a biometric key or characteristic detecting system, when it is actuated by a user whose biometric key has not been detected and stored, the control unit can allow the use of the machine to the user, presenting a general menu. This menu can include for example a function for inserting a new user with storage of the type of beverage and/or of the characteristics of some or all the selected beverages that the specific user prefers, as well as the function of storing the biometric key suitable to the subsequent automatic recognition of this new user. Alternatively, for example when the machine is used not only by a series of habitual users but also by one or more occasional users, it can be advantageous for the machine to offer a standard menu with pre-set and not customized parameters that can be activated by the occasional user.

Advantageously, the control unit can be programmed so as to present, on an interface device which allows manual selection, any one of the users whose biometric keys are stored and the pre-set parameters for preparing the customized beverages. For example, in an advantageous embodiment it is possible that, in addition to the recognition of an identification code of the user and/or of a biometric characteristic or key, the machine presents (in the case of absence of operation of the recognition system of the user) a list of stored users, i.e. users known to the machine and whose preset parameters for the supply of the different beverages are stored by the machine. In this way the user that has not been recognized by the machine can manually select from the interface device his/her name, or also the name of another user to whom he/she wants to bring the chosen beverage, prepared according to the taste and the parameters preset by said other user, without the need that this latter comes to the machine in order to be recognized.

The interface device can be a display device, for example a so called touch-screen, a display connected to a keyboard or to a series of buttons, an alphanumeric keypad, a system of buttons and luminous signals, or other. In some preferred embodiments it is also possible to use a touch-screen on which one or more pieces of information appear, one or more areas of action by the user are presented, for the selection of sub-menus, of types of beverages, of characteristics of the individual beverages to store or other.

In some embodiments the electronic control unit can be programmed so as to acquire and process data relating to the consumption of an individual user or of more users. For example, a function can be provided for controlling the calories intake of the user, for verifying the observance of a diet, or functions can be provided for the control and the verification of the quantity of coffee and therefore of caffeine assumed by the individual user. In both cases, it can be possible to set alarm signals or simply signals, or functions for stopping the supply of a given type of beverages, for example containing caffeine, if the user must observe a particular diet (for medical reasons or other).

Further advantageous characteristics and embodiments of the invention are indicated in the appended claims and will be described in greater detail below with reference to the attached drawings, which show a non-limiting embodiment of the present invention.

According to a different aspect, the invention relates to a coffee machine comprising: at least an infusion group for preparing coffee, a user interface, and an electronic control unit programmed for storing a plurality of customized menus associated with respective users and for allowing, through said interface, to select a menu from a list of stored menus. In this case the selection occurs manually without automatic recognition of the user, with less advantageous in terms of flexibility and practicality of use.

BRIEF DESCRIPTION OF THE DRAWINGS

The invention will be better understood by means of the description below and the attached drawing, which shows a non-restrictive practical embodiment of the invention. More in particular, in the drawing:

FIG. 9 shows a flow diagram of some operating modes of the machine according to the present invention.

DETAILED DESCRIPTION OF AN EMBODIMENT OF THE INVENTION

Figure 1:
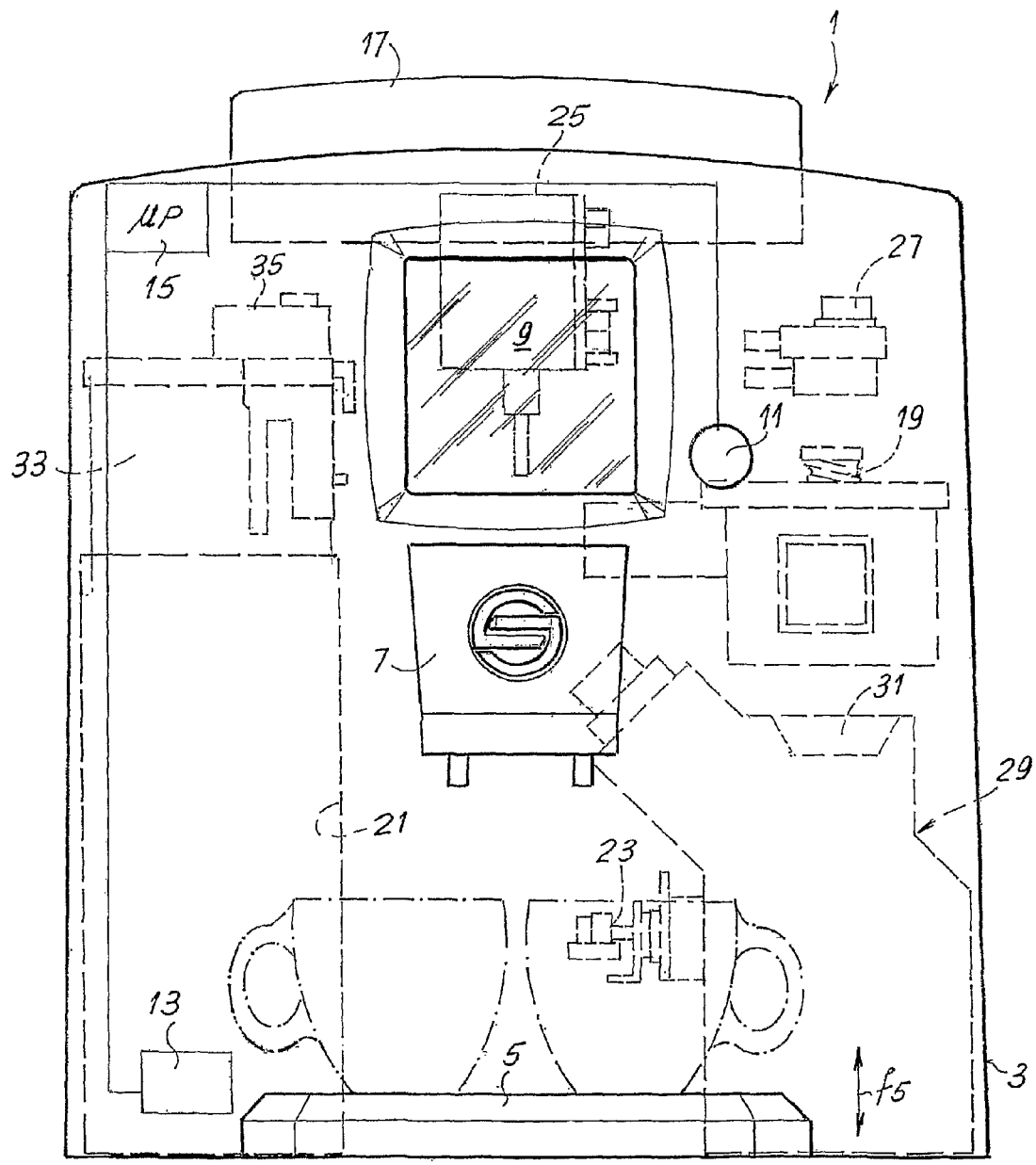
FIG. 1 shows a schematic view of an automatic coffee machine for domestic use, wherein the present invention is incorporated.

FIG. 1 shows in a very schematic manner an automatic machine for domestic use, indicated as a whole with the number 1, to which the present invention can be applied. Merely by way of example, FIG. 1 shows some of the components and of the groups with which the machine is fitted, being understood that they can vary according to the type of machine and to the functions available for the user. Furthermore, it should be understood that the concepts of the present invention can be applied also to other types of machines, for example to a vending machine.

In the illustrated example the machine includes a body 3 with a support 5, which can be advantageously adjusted in height (arrow f5) for resting one or two cups or other containers for collecting the beverage dispensed by one or two dispensing nozzles arranged inside a front dispensing body 7. Above the body 7 a display 9, or other user interface, is arranged, through which the functions of the machine are managed. Number 11 indicates a power button of the machine and/or for activating the infusion cycles, to which a biometric key recognition system can be associated, interfaced with an electronic central control unit 15. According to some embodiments, the button 11 can be combined with a sensor, or another finger print detecting member. In this case the control unit 15 is provided with an adequate program for finger print recognition.

In some embodiments, in addition to or alternatively to the biometric key recognition system, the machine can be provided with a reader 13, indicated in a schematic manner with a dashed line in the figure, arranged for example near the support 5 and interfaced to the control unit 15. The reader 13, when present, can identify the user who uses the machine through an identification code associated to the cup which the user puts on the support 5. Said reader can be an optical reader, for example a bar code reader or a reader suitable for reading OCR characters. In other embodiments, the reader 13 can comprise an antenna for reading data contained in an electronic tag, in a transponder or the like. In other embodiments, the reader 13 can be a reader for reading magnetic boards, microchip boards, electronic tags of different type, or in general any medium for a code that can be read by a machine and contained in a medium with which a specific user is equipped.

The machine is also fitted with a tank 17 for containing coffee beans which are ground by a coffee grinding unit 19 below. In other embodiments, the machine can be equipped with a tank for ground coffee, or with more tanks for ground coffee or coffee beans, for example to use alternatively normal coffee and decaffeinated coffee. In further embodiments the machine can be provided with one or more storage units of single serving sachets, such as for example capsules, pods or cartridges, with the possibility of selecting, through the control unit 15 and based upon criteria which will be apparent hereunder, one or the other of two or more qualities of packs, for example, for producing filter coffee, espresso coffee, decaffeinated coffee, etc. In this case the machine can be arranged also for using capsules for preparing different beverages, chocolate, tea, barley, which can be all selected by the user.

Number 21 indicates a water tank which, through a pump 23, is fed to a boiler 25. The quantity of water supplied by the pump 23 is measured by a flow meter 27 or other equivalent member. The pump 23 and the flow meter 27 and if the case the boiler 25 can be interfaced to the programmable control unit 15.

Number 29 indicates the infusion unit which receives in a hopper 31 the coffee powder obtained by grinding, performed by the unit 19, of the beans contained in the tank 17. The infusion unit can have any adequate shape. It can be designed so as to use coffee powder, or capsules or other single vending sachets. It is also possible to provide, in the same machine, two or more infusion units of different type, for example for use of coffee powder and single serving sachets, respectively.

In this embodiment, the machine is further provided with a tank 33 for the milk, to which an emulsifying device 35 is associated which, controlled by the user, can feed towards the nozzles contained in the unit 7 hot milk, heated through the steam generated by the boiler 25, or milk froth, for example for producing cappuccino, obtained by emulsifying milk and air. In some embodiments the steam can be generated by an additional boiler in series or in parallel to the boiler 25.

The emulsifying device 35, the infusion units, the pumps and the other components of the machine are known per se to those skilled in the art, and they will not therefore described in greater detail.

Coffee machines of this type are suitable, through the programmable control unit 15, to manage the supply of a series of beverages of different type and more in particular, for example: espresso coffee, filter coffee (also called American coffee), hot milk, cappuccino, "latte macchiato" and the other. It is also possible, through setting of the various members (in particular of the grinding unit 19) to obtain more or less strong coffee, i.e. coffee produced with a greater or lower quantity of coffee powder, with a more or less fine grinding of the coffee. In some of these machines it is also possible to adjust the counter-pressure at the exit of the infusion unit 29 through an adequate valve, which can be interfaced to the control unit 15. The control of the pump and the measure of the flow by means of the flow meter also allow to vary the quantity of supplied water for each infusion cycle, according to the organoleptic qualities of the desired beverage.

According to an advantageous embodiment of the present invention, the biometric key recognition system, preferably associated with the power button 11, allows to recognize the user who uses the machine 1 and in particular it allows: (a) to store a series of characteristic data or parameters for the production of beverages according to the customized taste of the user; and (b) to actuate for each specific user the customized menu, and therefore to obtain the production of the beverage according to the preset and stored parameters.

For this purpose, the unit 15 can be programmed in such a manner to present on the interface 9, for example a touch-screen display, a main menu which allows manual selection of the user, for example when the user does not want or can not use the automatic biometric recognition system, or which can be used to store the parameters of a new user. The operation of a machine provided with a touch-screen and with some given operating functions will be described in detail hereunder. It should be understood that this description is merely by way of example, and it should not be intended in a limiting manner as regards both the type of user interface used and the type of functions, operating sequences, communicating modes with the machine etc. For example, as mentioned above, instead of a touch-screen the machine can be provided with a keyboard with one or more buttons and a display, or indicator lights, such as LEDs or other.

Figure 2:
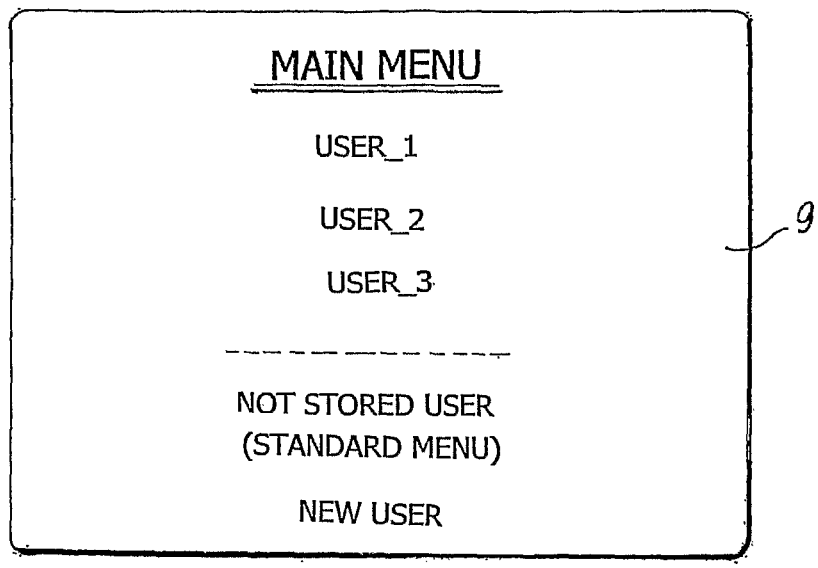
FIGS. 2 to 8 show a display forming part of a user interface for managing the machine in different phases and modes of use.

With reference to the example illustrated, in FIG. 2 a possible aspect of the display 9 is shown, when the main menu appears on it. This can be displayed for example when the machine is switched on, or in case of failure of the reading system 11 of the biometric key. The main menu can present a list of users (for example indicated with the personal name of the user, but here indicated generically as "user 1", "user 2" etc.), whose preferred parameters for the production of respective beverages have been previously stored through the control unit 15. The main menu can furthermore present two subsequent functions, which allow accessing a standard menu for a user who doesn't want to store customized data or parameters, for example an occasional user who uses the machine only once or very seldom or occasionally. It is also possible to provide a further function for storing the parameters of a new user.

When the machine operates correctly, and if it is provided with a biometric key recognition system, for example a finger print reader associated with the button 11, by actuating this system, for example resting the tip of the forefinger on the switch-on button 11 of the machine, this can recognize the user and directly present on the display 9 the menu customized for this user or, alternatively, when for example the machine is not able, for any reason, to recognize the user, the main menu is displayed on the display 9 (FIG. 2) and the user can access his/her own customized menu by touching the display 9 at correspondence of his/her name (for example "user 1").

Figure 3:
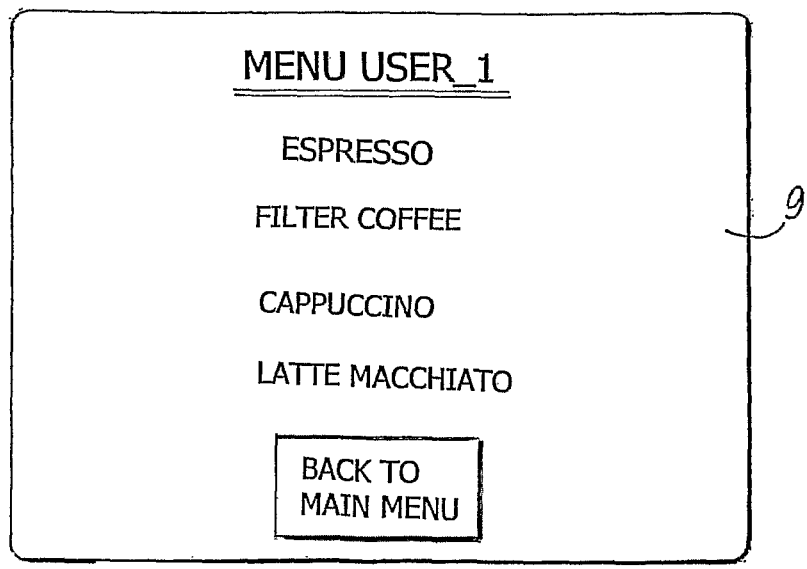

FIG. 3 shows merely by way of example a possible customized menu for the user called "user 1". This user has previously stored the preferred beverages, for each of which he/she has stored the production parameters (water quantity, coffee quantity, granulometry of the coffee, milk quantity, absence or presence of a greater or smaller quantity of milk froth, etc.). In the schematic example of FIG. 3, the menu customized for the user 1 provides for the choice between espresso coffee, filter coffee, cappuccino and "latte macchiato". It should be understood that if a given user usually drinks exclusively espresso and does not want to store the parameters for the production of another beverage, as he/she does not use it, the customized menu for this user can be configured so as to present only an item: "espresso coffee".

Once the customized menu "user 1" is displayed on the display 9, as in FIG. 3, the user can select one or the other of the beverages shown on the menu to actuate the cycle of preparation of this beverage. Actuation can occur simply through contact on the display 9 when it is a touch-screen display. In other embodiments, adjacent to the display 9 one or a series of actuating buttons can be provided, associated to each row of the display 9.

Having stored the preferred parameters for each beverage, for example the quantity of water and coffee, as well as the granulometry of the coffee as regards espresso coffee and filter coffee, the user can always obtain the beverage supplied according to his/her taste parameters, without any other intervention.

Figure 4:
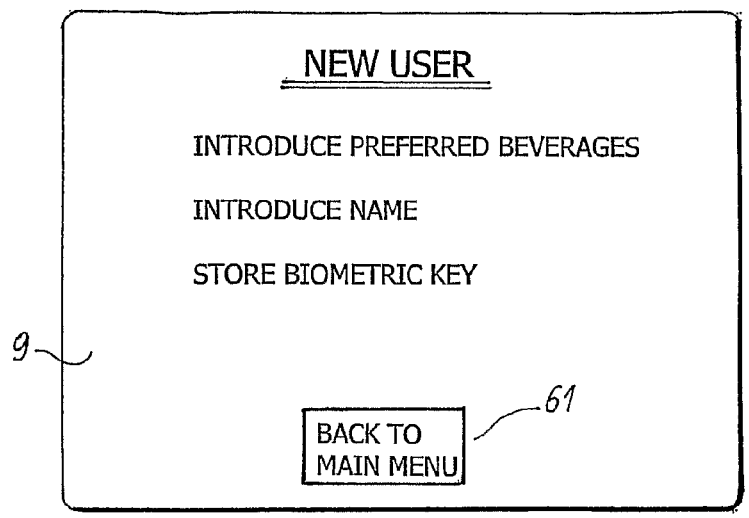

The electronic programmable control unit 15 can be advantageously designed so as to actuate, through the main menu (FIG. 2), a function of recording and storing a new user profile by means of a specific menu. FIG. 4 shows, merely by way of example, a possible aspect that the menu can assume in the interface display 9. In the illustrated example the menu for setting the new user requires the entry of the preferred beverages, the entry of the user's name and the storage of the biometric key. If the machine is equipped with a different recognition system, for example a reader 13, this menu will have the function of storing the user code. It is also possible to enter the user's code manually, for example through a keyboard or a touch-screen. In this case it is again possible to access a customized menu, even if with more complex operations and therefore less advantages than a machine equipped with a biometric key reading system.

Once having accessed the menu for setting the new user, he/she can select the beverage(s) he/she usually drinks by actuating the first item "enter preferred beverages" through touch on the touch-screen display 9, or through pressing a button associated with a display 9 of the traditional type. This allows accessing the corresponding sub-menu which, merely by way of example, can assume the aspect shown in FIG. 5. The user can choose one or the other of more beverages which, merely by way of example, in this example are the following: espresso coffee, filter coffee, cappuccino, "latte macchiato". Advantageously, to each beverage which can be selected an icon can be associated, which makes the use of the sub-menu more intuitive. In the illustrated example, with the espresso coffee is associated an icon representing a cup of espresso coffee, adjacent to the item filter coffee is represented an icon showing a cup of greater dimensions, near the item cappuccino a cup is represented with milk froth on top, and close to the item "latte macchiato" a glass is represented.

Figure 6:
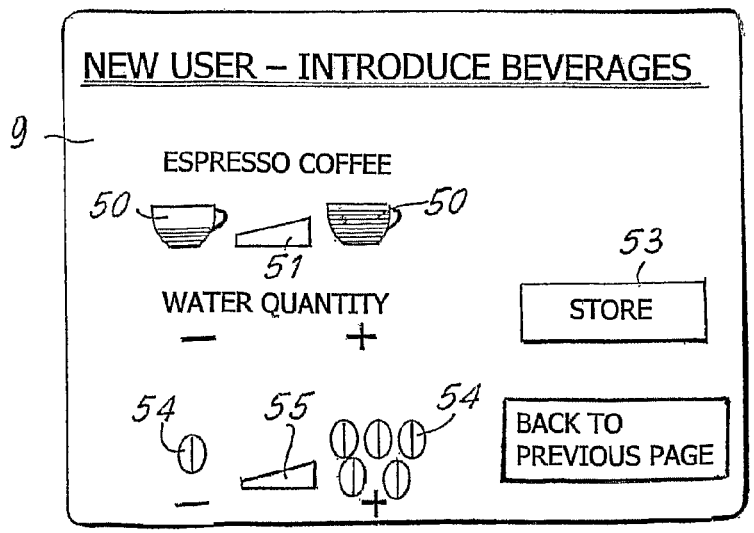

By actuating, again through touch on the touch-screen 9 or pressing a button associated with the display, one or the other of the items of the menu, a further sub-menu can be actuated, schematically represented in FIG. 6. Here the sub-menu relating to the item "espresso coffee" is illustrated merely by way of example. In this case the user can set a series of parameters which determine the final characteristics of the beverage.

By way of example, among the parameters which can be set there is the water quantity desired for each coffee, to set an espresso coffee "lungo" or "ristretto". The selection can be made for example by pressing one or the other of the two areas corresponding to the icons 50 representing the two cups, so increasing or decreasing an index 51 which gives the user in an intuitive manner information about the quantity of water which will be supplied for the production of his/her espresso coffee. In an area 53 of the display 9 it is possible to provide an area which allows storing of the set quantity of water.

Analogously the user can set, by pressing one or the other of the two icons 53 representing coffee beans, the quantity of coffee powder desired for each supply. An icon 55 allows displaying the quantity of set coffee. The area 53 allows storing the quantity of set coffee. By pressing the area 55 the user can go back to the previous menu.

Figure 5:
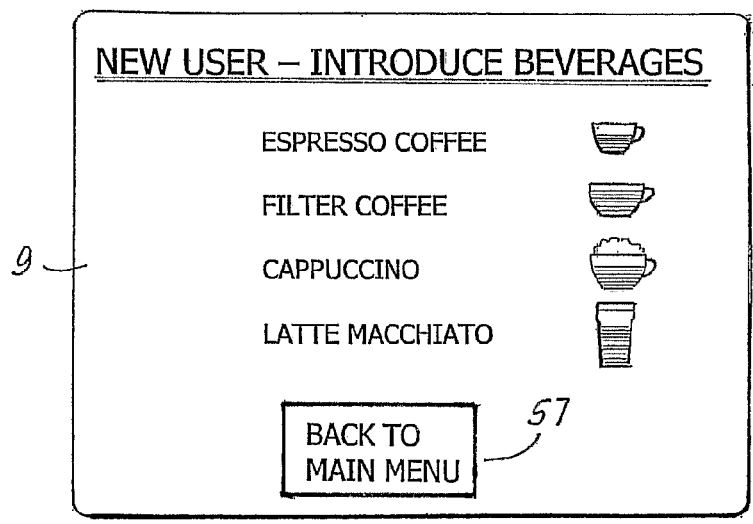

A sub-menu similar to that of FIG. 6 can be provided for each of the beverages listed in the sub-menu of FIG. 5, so as to set the various parameters, for example the quantity of coffee and water for a filter coffee, the quantity of coffee and water and the quantity of milk and the greater or lower foaminess for the cappuccino, the quantity of coffee and milk, the temperature of the milk and the quantity of foam for the "latte macchiato" and so on.

Figure 7:
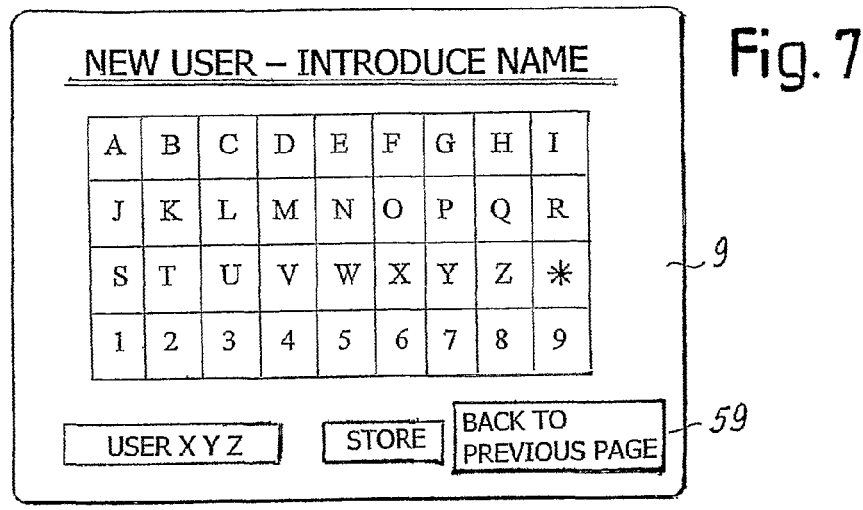

From the interface of FIG. 5 it is possible to go back, through touch for example on the interactive area 57 of the touch-screen 9, to the previous page, i.e. to the menu of FIG. 4. From the menu "new user" of FIG. 4 it is possible to go to the second item "enter name" by actuating for example an interface as represented in FIG. 7, wherein the user can store his/her name simply by touching in sequence the display 9 on points corresponding to the various letters. The control unit 15 can therefore store the name written by the new user combining it to the beverages that the user has stored with the respective production parameters set as described above with reference to FIGS. 5 and 6 respectively.

From the page of FIG. 7 by touching the area 59, the user can go back to the sub-menu "new user" of FIG. 4 to store the recognition biometric key. This can occurs for example by touching or actuating the item "store biometric key" and putting the tip of the forefinger on the button 11 of the biometric key reading or recognition system. A suitable signal can be provided to indicate to the user that the reading system is actuated to store and/or confirm the correct storage of the key, or to signal a reading error and therefore the need for repeating the biometric key-acquiring procedure.

When the biometric key reading system is of a different nature, another type of operation will be necessary, for example a vocal recognition can be provided; in this case a microphone will be actuated, through which the central unit 5 will acquire the voice pattern of the user. By touching the area 61 of the display 9 (FIG. 4) the user can close the operations of customization and storage and put the machine on stand-by.

Figure 8:
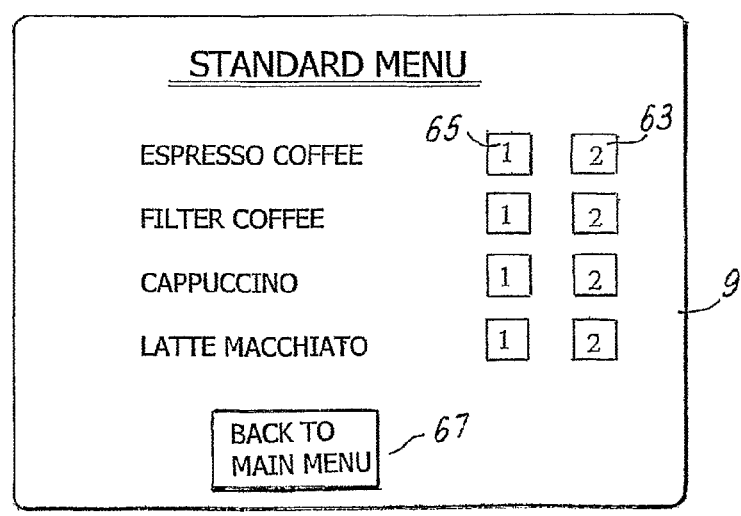

When, as mentioned above, the user desires to use the machine according to general parameters not associated to a specific user, he/she can choose from the main menu the item "not stored user (standard menu)"; in this case for example a sub-menu as that indicated in FIG. 8 can be displayed. In this embodiment the machine presents to the user (who can be an occasional user, or even one of the stored users who desires, exceptionally, to prepare a different beverage or a beverage produced with parameters different from those stored) the standard menu schematically illustrated in FIG. 8 and allows the choice of any beverage which the machine is able to produce (in the illustrated example espresso coffee, filter coffee, cappuccino, "latte macchiato"). For each beverage the user can choose whether to produce a single cup or two cups always using, in this embodiment, the touch-screen display 9 by touching the respective areas 63, 65 of the screen. In this way, the cycle is actuated for supplying the desired beverage.

The operation can be repeated all the times as required, until the user, after having supplied all the desired beverages, by touching the area 67 puts the machine in stand-by again to the main menu (FIG. 2).

The diagram of FIG. 9 shows a possible operation logic of a machine so equipped.

The user can actuate the biometric key reader for example by pressing a switch-on button 11. The finger print reader or the reader for any other biometric key is actuated (block 80 of the diagram of FIG. 9). The central unit, once acquired information from the biometric key reading system, will try to recognize the user (block 81). If the user is not recognized as he/she is not among that stored, or simply as the biometric key reading system was not able to recognize correctly the key, the user can try again, for example by pressing twice the button 11 or in any other suitable manner. Alternatively, the machine, according to the diagram of FIG. 9, will present on the display 9 the main menu (FIG. 2) (block 82). The user therefore can select, through this menu, one of the customized menus, thus performing a manual selection (block 83; block 86). If the user does not select one of the customized menus, the machine verifies whether the item "new user" of the main menu (block 84) has been selected; in this case it initiates the procedure for storing the new user (block 89, FIG. 9). If this is not the case, the standard menu will be displayed (block 85) and the machine will wait for the relative command (FIG. 8).

Vice versa, if the user is recognized by the biometric key reading system, the customized menu (block 86) of FIG. 9 is directly initiated. The control unit 15 arrives to this block also if, in the block 83, the user actuates one of the items for actuating one or the other of the customized menus. At the block 86 the machine displays the customized menu (FIG. 3) and acquires (block 87) the command of the user, who selects the chosen beverage through the interface (touch-screen display 9 or other similar system with buttons or the like). Therefore the cycle is carried out (block 88) of supplying the chosen beverage according to the parameters stored by the user in the manner described above.

If the user actuates (block 84) the function for creating and storing a new user's profile, the control switches to the block 89, i.e. it initiates the wizard for creating the new user's profile as described above with specific reference to the menus represented in FIGS. 4, 5, 6, and 7. In the block 90 the function of storing the new user's data associated with the biometric key is schematically illustrated, whilst the block 92 indicates the return of the machine in stand-by condition with the main menu displayed on the display 9.

In view of the above description it is apparent that with a so equipped machine with a programmable control unit 15 adequately programmed it is possible to store the data and parameters which allow to an adequate number of different users to supply beverages always produced according to the customized parameters set by each user. In this way, each user can therefore always have a beverage prepared according the parameters he/she likes, without the need of setting each time the variables that the machine presents for the customization of the beverages.

At the same time, in this embodiment each user is free not to use the set parameters and to access (through the main menu, FIG. 2) also to the customized menus of different users or to a non customized menu.

In some embodiments it is possible to provide that the recognition of the user occurs, as mentioned above, through reading of a univocal code associated to the container (cup or glass) with which each user is provided. Alternatively, the identification code of the user can be associated to a card, the user is provided with. This last solution can be particularly advantageous in the case of vending machines, where each user can be provided with a prepaid card for the consumption of the beverages, on which it is arranged, in any adequate manner, a univocal code that the machine associates to the previously stored parameters of the user. This solution can be useful for example in machines destined, instead of the domestic use, to a professional use in public places or simply in offices or other work places where a variable number of users can use the same pay machine.

In some less advantageous embodiments it is possible to renounce to the reading of the univocal code through the reader 13 or to the reading of the biometric key through the reader 11 or other adequate reader, and to provide again the possibility of storing customized menus and therefore of choosing one or the other of more customized menus through the interface represented by the display 9 or other suitable interface with a procedure of the type described with reference to FIG. 2 or other adequate procedure. In this case obviously an important part of the advantages is missed, which can be achieved with the automatic reading of the biometric key or of the univocal code associated to each user.

The control unit 15 can be programmed also to store for example the quantity of the individual beverages taken by each stored user and it can provide, in a specific menu, or in the main menu, an item for displaying the consumptions of each user. This can be useful for example to allow individual users which follow a given diet to verify the calories taken through the consumption of beverages supplied by the machine. According to other embodiments of the present invention, the storage of the personal data of the users can allow a control of the number of accesses to the machine, or it can allow to obtain a statement of the consumptions and to allow the users to pay the beverages at the end of a given period instead of using a prepaid card or cash for the payment of the beverages at each supply.

It is understood that the drawing only shows an example provided by way of a practical arrangement of the present invention, which can vary in forms and arrangements without however departing from the scope of the concept underlying the invention. Any reference numbers in the appended claims are provided for the sole purpose of facilitating reading of the claims in the light of the description and the drawing, and do not in any manner limit the scope of protection represented by the claims.

The invention claimed is:

1. A machine for dispensing beverages, comprising:
at least an infusion group for preparing coffee, a user interface, and an electronic programmable control unit;
wherein said control unit is associated with a recognition system for recognizing at least one biometric characteristic of a user, said control unit being programmed to actuate at least one function of the machine based upon the recognition of the user,
wherein said control unit is programmed for associating a customized menu to at least one user recognizable by said recognition system,
wherein for each beverage inserted into the customized menu, one or more supply parameters are set by the user,
wherein said machine is programmed to display the customized personalized menu and acquire a command of the user for selecting the chosen beverage from said personalized menu
wherein said machine is programmed to display on the user interface, in the absence of the operation of the recognition system, a list of a plurality of stored user names, each user having an associated customized menu stored by the machine, and to allow the user to manually select one or more of the stored customized menus associated with one or more of said stored users, and
wherein said control unit is programmed for allowing a user, through said interface, to select a standard menu or a menu selected from a plurality of customized menus, each of which is associated with a respective user.

2. A machine as claimed in claim 1, wherein said recognition system is a system for recognizing a user based upon at least one characteristic recognizable on the user's hand.

3. A machine as claimed in claim 2, wherein said recognition system is designed for recognizing a user based upon at least one of the following characteristics:
the fingerprint; the distribution of the blood vessels in a fingertip.

4. A machine as claimed in claim 1, wherein said recognition system comprises a reading device associated with a control push button of said machine.

5. A machine as claimed in claim 4, wherein said control push button comprises a fingerprint reader.

6. A machine as claimed in claim 1, wherein said recognition system is designed to read a univocal identification element associated with a user.

7. A machine as claimed in claim 1, wherein said recognition system is designed to recognize a container, such as a cup, coffee cup or glass, whereto is associated said univocal identification element associated with a user.

8. A machine as claimed in claim 6, wherein said recognition system comprises a reading device for reading an identification code of the user.

9. A machine as claimed in claim 8, wherein said recognition system comprises a reader for reading a code stored in a transponder.

10. A machine as claimed in claim 1, wherein said control unit is programmed to associate to at least one user recognizable by said recognition system at least one series of parameters for the production of at least one beverage according to parameters preset and stored by the user.

11. A machine as claimed in claim 1, wherein it comprises a display device, and wherein said control unit is programmed for presenting on said display device at least one information associated with at least one user recognizable by said recognition system when said recognition system recognizes said user.

12. A machine as claimed in claim 11, wherein said control unit is programmed for allowing a user to actuate a non-customized standard menu.

13. A machine as claimed in claim 11, wherein said control unit is programmed for activating a non-customized standard menu when the recognition system is not able to recognize the user that interacts with the machine.

14. A machine as claimed in claim 1, wherein said control unit is programmed for storing information relating to the consumptions associated with one or more of the users recognizable by said control unit.

15. A machine as claimed in claim 14, wherein said control unit is programmed for performing one or more of the following operations: to calculate the consumption of calories; to determine the quantity of drunk beverages; to generate a signal of excessive consumption or excessive intake of calories.

16. A machine for dispensing beverages comprising:
at least an infusion group for preparing coffee,
a user interface, and
an electronic programmable control unit; wherein said control unit is programmed for recognizing at least one biometric characteristic of a user, said control unit being programmed to actuate at least one function of the machine based upon the recognition of the user, and for associating and storing a plurality of customized menus associated with respective users and for allowing, through said interface, to select a menu from a list of stored menus, wherein said control unit is programmed to display, in the absence of the operation of the recognition system, a list of a plurality of stored user names, each user having an associated customized menu stored by the machine, and to allow the user to manually select one or more of the stored customized menus associated with one or more of said stored users, and wherein the control unit is programmed for allowing a user, though said interface, to select a standard menu or a menu selected from a plurality of customized menus, each of which is associated with a respective user.

\* \* \* \* \*